(12) United States Patent
Heishi et al.

(10) Patent No.: US 8,392,905 B2
(45) Date of Patent: Mar. 5, 2013

(54) COMPILING APPARATUS

(75) Inventors: Taketo Heishi, Osaka (JP); Shohei Michimoto, Osaka (JP); Yukio Iimura, Kyoto (JP); Yasuhiro Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 1391 days.

(21) Appl. No.: 12/048,401

(22) Filed: Mar. 14, 2008

(65) Prior Publication Data

US 2008/0307403 A1 Dec. 11, 2008

(30) Foreign Application Priority Data

Mar. 27, 2007 (JP) .................................. 2007-082194
Jan. 18, 2008 (JP) .................................. 2008-009763

(51) Int. Cl.
G06F 9/44 (2006.01)
G06F 9/45 (2006.01)
(52) U.S. Cl. ........................................ 717/169; 717/153
(58) Field of Classification Search .................. 717/140, 717/151–152, 159
See application file for complete search history.

(56) References Cited

U.S. PATENT DOCUMENTS

| | | | | |
|---|---|---|---|---|
| 4,589,087 A | * | 5/1986 | Auslander et al. | 708/670 |
| 5,828,886 A | | 10/1998 | Hayashi | |
| 5,870,596 A | * | 2/1999 | Yoshida | 712/225 |
| 6,192,513 B1 | | 2/2001 | Subrahmanyam | |
| 6,240,508 B1 | * | 5/2001 | Brown et al. | 712/219 |
| 2004/0015874 A1 | | 1/2004 | Ungar | |
| 2004/0064301 A1 | | 4/2004 | Kondo et al. | |
| 2005/0027969 A1 | * | 2/2005 | Simon et al. | 712/225 |
| 2005/0283588 A1 | * | 12/2005 | Yamashita | 712/217 |
| 2006/0212440 A1 | | 9/2006 | Heishi et al. | |
| 2006/0236214 A1 | * | 10/2006 | Ferguson | 714/796 |
| 2006/0277529 A1 | | 12/2006 | Michimoto et al. | |
| 2007/0168984 A1 | | 7/2007 | Heishi et al. | |
| 2008/0320246 A1 | * | 12/2008 | Fuhler et al. | 711/154 |

FOREIGN PATENT DOCUMENTS

| | | |
|---|---|---|
| JP | 62-163145 | 7/1987 |
| JP | 8-6797 | 1/1996 |
| JP | 9-034724 | 2/1997 |

(Continued)

OTHER PUBLICATIONS

Machida et al., "High Performance C Compiler for V850 Family CA850", Technical Journal, vol. 48, the 8th issue, NEC Creative, Inc., Sep. 11, 1995, pp. 43-44.

(Continued)

*Primary Examiner* — Anna Deng
(74) *Attorney, Agent, or Firm* — Greenblum & Bernstein, P.L.C.

(57) ABSTRACT

The present invention effectively utilizes auxiliary registers and provides a compiler system which secures error detectability when the auxiliary registers are shared for plural uses. The instruction definition resource configuring unit configures, as preparation for processing by the register assigning unit, respective resources such as a register to be defined or referred to by for each instruction in an intermediate code. The instruction definition resource configuring unit detects possibility of instructions each of which is to be decomposed into plural instructions. As for an instruction to be possibly decomposed, the instruction definition resource configuring unit configures a corresponding register in the intermediate code, assuming the corresponding register used for the decomposition to be defined and referred. The register assigning unit uses the register as a general register as far as a live range of the register used for the decomposition does not overlap.

21 Claims, 12 Drawing Sheets

FOREIGN PATENT DOCUMENTS

| | | |
|---|---|---|
| JP | 2000-029718 | 1/2000 |
| JP | 2004-013190 | 1/2004 |
| JP | 2004-126666 | 4/2004 |
| JP | 2006-079494 | 3/2006 |

OTHER PUBLICATIONS

Fukuyama et al., Feature article—Concept of Error Handling and Programming—second chapter—Practical help; error handling and programming for preventing errors (Tokushuu—Era Shori no KangaeKata to Puroguramingu—Dai Ni Shou—Jitsuyou, Era Shori & Era Taisaku Puroguramingu), Interface, vol. 20, the 11$^{th}$ issue, CQ Publishing, Co., Ltd., Nov. 1, 1994, pp. 80-82.

Japan Office action, mail date is May 15, 2012.

English machine translation of JP 8-006797.

English language Abstract of JP 8-6797.

* cited by examiner

FIG. 3

| Pattern ID | Single instruction | Plural instructions |
|---|---|---|
| 1 | add R1, imm16 | setlo R29,LO(imm32)<br>sethi R29,HI(imm32)<br>add R1,R29 |
| 2 | ld R0,(R1,disp10) | setlo R29,LO(disp32)<br>sethi R29,HI(disp32)<br>add R29,R1<br>ld R0,(R29) |
| 3 | br disp20 | setlo R29,LO(addr32)<br>sethi R29,HI(addr32)<br>mov TAR,R29<br>jmp TAR |

FIG. 5

| Instruction address offset | Compilation pattern ID |
|---|---|
| 32 | 2 |
| 160 | 3 |
| 248 | 2 |
| 536 | 1 |

FIG. 6

Assembly program generated by compiler 102

```
FILE test.c            ... (a)

func1 :
    add   R29, R0, R1   ... (b)
    ld    R0, (R2, 4)   ... (c)
    sub   R0, R29       ... (d)
    ret

END
```

FIG. 10

Assembly program generated by compiler  102

```
expandinst_without warning   ... (a)

func1 :
   add   R25, R0, R1
   ld    R0, (R2, 4)
   sub   R0, R25
   ret

END
```

FIG. 11

Assembly program written by programmer  103

```
func2 :
   ld  R3, (gp, _value - _gptop)
   add R3, R0
   ...

noexpandinst           ... (b)

mov  R29, R0           ... (c)
   ...
   add  R1, R29           ... (d)
   ...

expandinst             ... (e)

call func3
   ret

END
```

(X) spans from (b) to (e)

FIG. 13

| Instruction address offset | Compilation pattern ID | Register use mode |
|---|---|---|
| 32 | 2 | 1 |
| 160 | 3 | 2 |
| 248 | 2 | 2 |
| 536 | 1 | 1 |

COMPILING APPARATUS

BACKGROUND OF THE INVENTION (1) Field of the Invention

The present invention relates to compiling apparatuses for compiling a source program written in the C language or an assembly language into a machine language program, and particularly to a compiling apparatus which secures error detectability in the source program, effectively utilizing a register included in a processor.

(2) Description of the Related Art

In processor-executable instructions, handling constants such as an immediate number and an address, when a bit width of the constants overflows a predetermined width for the instruction format, a single instruction alone cannot achieve the function. Thus, the instruction needs to be decomposed into several instructions, dividing the instruction into an instruction for configuring the constants and an instruction for computing.

In the meantime, there exists a conventional scheme for an effective reference to constants, decomposing a single instruction into several instructions when compiling the source program, as shown in the invention described in the Japanese Unexamined Patent Application Publication No. 08-6797.

Further, whether or not a value, such as an address, overflows cannot be found until object files linking. Therefore, there exists another scheme which: generates in advance a machine language code that uses single instructions when compiling; and decomposes the instructions that should be decomposed alone into several instructions when linking, utilizing an auxiliary register as needed.

However, in the case where the instruction is decomposed into several instructions when compiling before most of values, such as an address and a displacement, are not determined, the decomposition is performed on the instructions that should not be decomposed, as well. This results in inefficiency for use efficiency and a code size.

Moreover, the scheme that decomposes the instructions that should be decomposed alone when linking, utilizing the auxiliary register, requires the auxiliary register to be reserved. This results in problems, such as performance degradation by register pressure, an increase in hardware resources, and a decrease in hardware use efficiency because the auxiliary register cannot be used as a general register.

To address the above problems, the auxiliary register could possibly be shared for the general register use on the programmer's responsibility. However, no tools detect an error in misuse of the auxiliary register. This results in a decrease in debugability and development efficiency of programs.

SUMMARY OF THE INVENTION

The present invention is conceived in view of the above problems and has as an objective to provide a compiler system which achieves an efficient use of the auxiliary register for decomposing instructions and which can secure error detectability when the auxiliary register is shared for plural uses.

In order to achieve the above objectives, a compiling apparatus in an aspect of the present invention compiles a program written in a high-level programming language or an assembly language into a machine language code on which a target processor operates, and includes: a first use instruction judging unit which judges whether or not a resource of the target processor is used for a first use based on each of instructions in the program; and a second use instruction generating unit which generates the machine language code to use the resource for a second use in the case where the first use instruction judging unit judges that the instruction does not to use the resource for the first use, the second use which is different from the first use.

This structure allows a register resource included in a processor to be automatically shared for plural uses, thus improving use efficiency and reducing a code size. In addition, use efficiency of a hardware resource such as the auxiliary register for instruction decomposition improves, as well.

Preferably, one of the first use and the second use is for a complement to an instruction of which a value operand overflows an operand width in the case where the instruction in the program is converted into the machine language code.

Moreover, the complement is to divide the instruction, of which the value operand overflows the operand width, into plural instructions, using the resource.

This structure allows the auxiliary register for instruction decomposition to be used as a complement to an instruction purpose, as well as general purposes. This enables the auxiliary register to be used efficiently.

Preferably, one of the first use and the second use is for controlling a specific function of the target processor.

This structure allows the resource of the target processor to be used for a control of the target processor, as well as for a general purpose. This enables the resource of a processor to be used efficiently.

A compiling apparatus in another aspect of the present invention compiles a program written in a high-level programming language or an assembly language into a machine language code on which a target processor operates and includes: a designation receiving unit which receives a designation from a programmer in a use of a resource in the target processor; and a code generating unit which generates the machine language code using the resource for the use which the designation specifies.

This structure allows the resource of a processor to be used for plural uses according to the intentions of the programmer. This improves the use efficiency and reduces the code size. Furthermore, use efficiency of the resource of the processor improves, as well.

Preferably, the compiling apparatus includes: an assembler which converts an assembly program into the machine language code and generates object files each of which contains the machine language code; and a linker which converts one or more of the object files into an execution form file by linking the one or the more of the object files, wherein the assembler includes the designation receiving unit and the code generating unit, and the code generating unit includes: a use judging unit which judges, based on the designation received by the designation receiving unit, the use of the resource in instruction descriptions each of which is in the assembly program; and a converting unit which converts the instruction descriptions in the assembly program into the machine language code, using the resource for the judged use.

Moreover, the use judging unit judges a first range in which the register, in the target processor corresponding to the resource, is used as a general register and a second range which is used for a complement when the value operand overflows, the converting unit converts i) the instruction description included in the first range into the machine language code which is identical to the instruction description, the first range which is judged by the use judging unit that the register is used as the general register in the first range and ii) the instruction description included in the second range into the machine language code in which the overflow of the value operand is complemented, the instruction description which is included in the second range for which the use judging unit judges that the register is used for the complement, the linker includes an address resolving unit which fixes a location address on a memory by linking the inputted object files, and the address resolving unit detects an error in the case where a resolved value of the value operand overflows an operand width of the instruction.

This allows the register used as the complement for when the value operand overflows to be utilized as a general register as well. Meanwhile, detectability of errors caused by a programming mistake can be secured and software development efficiency can be improved.

Note that the present invention can be implemented not only as the compiling apparatus including the characteristic units mentioned above, but also as a compiling method which utilizes the characteristic units included in the compiling apparatus as steps, and as a program causing a computer to function as the characteristic units included in the compiling apparatus. Such a program can be distributed through a storage medium such as a Compact Disc-Read Only Memory (CD-ROM) and the like and a communication network such as the Internet and the like.

By utilizing a register conventionally used for a specific use for plural uses, the use efficiency can be improved and the code size can be reduced. Further, error detectability when utilizing the register for the plural uses is secured, allowing software development efficiency to improve.

FURTHER INFORMATION ABOUT TECHNICAL BACKGROUND TO THIS APPLICATION

The disclosure of: Japanese Patent Application No. 2007-082194 filed on Mar. 27, 2007 including specification, drawings and claims; and Japanese Patent Application No. 2008-009763 filed on Jan. 18, 2008 including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 3 shows one example of replacement patterns to plural instructions in the case where an operand value for a single instruction overflows;

FIG. 5 shows one example of pieces of optimized information in the first embodiment of the present invention;

FIG. 6 shows one example of assembly programs generated by compiler in the first embodiment of the present invention;

FIG. 10 shows one example of assembly programs generated by compiler in a second embodiment of the present invention;

FIG. 11 shows one example of assembly programs written by programmer, including a pseudo-instruction "noexpand-inst" in the second embodiment of the present invention;

FIG. 13 shows one example of pieces of optimized information in the second embodiment of the present invention.

DESCRIPTION OF THE PREFERRED EMBODIMENTS (First Embodiment)

Figure 1:
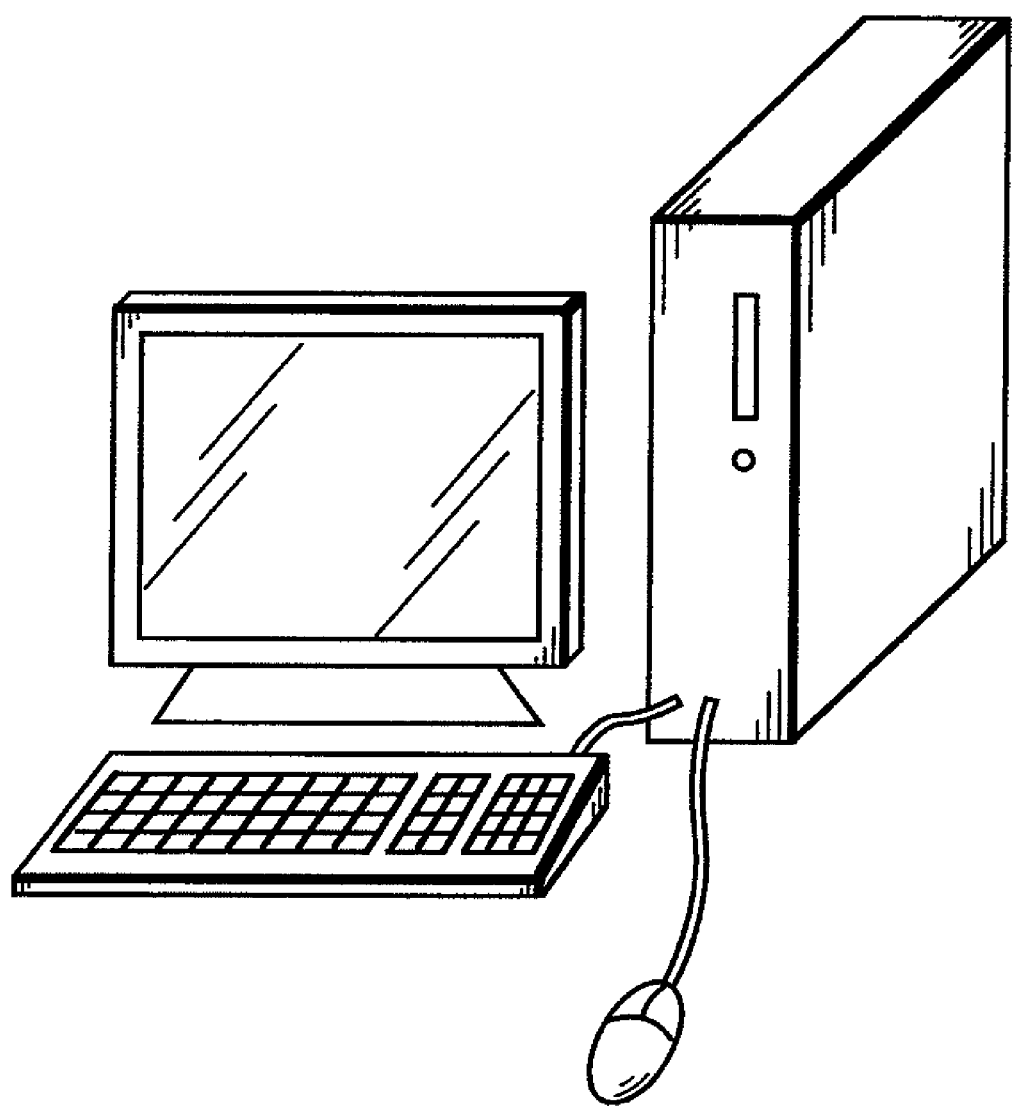
FIG. 1 is an appearance diagram of a computer for implementing a compiler system in a first embodiment of the present invention.

A compiler system in a first embodiment of the present invention shall be described with reference to the drawings. Note that this compiler system is realized by executing a program on a computer shown in FIG. 1.

Figure 2:
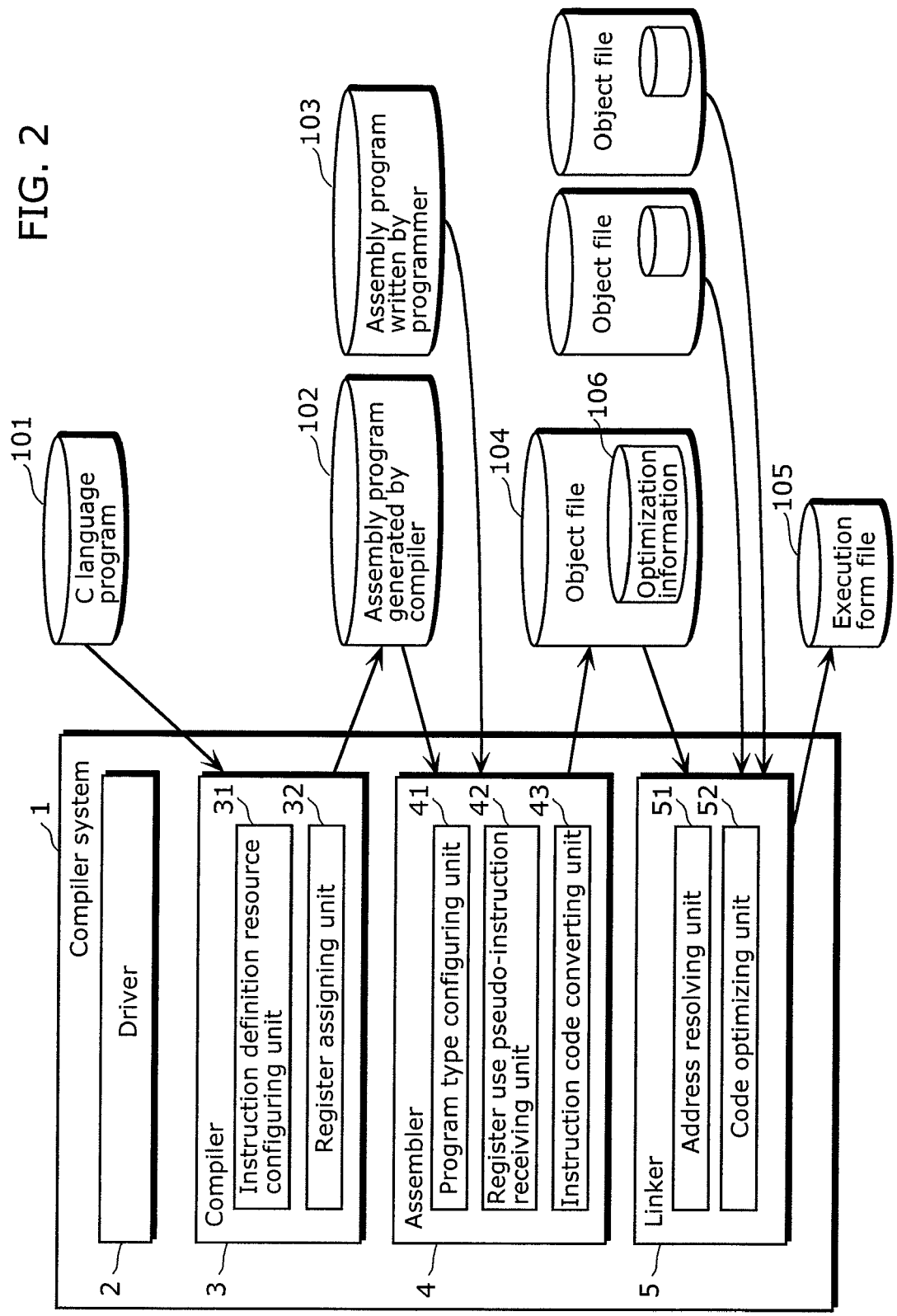
FIG. 2 is a block diagram of the compiler system in the first embodiment of the present invention.

FIG. 2 is a block diagram showing a structure of a compiler system in the first embodiment of the present invention.

The compiler system 1 includes a driver 2, a compiler 3, an assembler 4, and a linker 5.

According to a user-specified option, the driver 2 activates as needed other structural elements of the compiler system 1; namely, the compiler 3, the assembler 4, and the linker 5, using an appropriate option. For example, the driver 2 can activate the assembler 4 alone. The driver 2 can also activate the assembler 4 and the linker 5 alone.

The compiler 3 receives a C language program 101 written by a programmer as an input, compiles the C language program 101 into an internal intermediate representation, performs optimization and assignment of respective resources, and generates an assembly program generated by compiler 102 for use by a target processor.

The assembler 4: receives one of the assembly program generated by compiler 102 that is generated by the compiler 3 and an assembly program written by programmer 103 which is written by the programmer; converts one of the assembly program generated by compiler 102 and the assembly program written by programmer 103 into a machine language code; and generates an object file 104 composed of each of machine codes. The object file 104 includes optimization information 106 to be used for optimization in a linker 5.

The linker 5 receives one or plural object files as an input, resolves an unsolved address in an external symbol and a displacement value included in the object file, optimizes the code, and generates an execution form file 105.

Here, instruction specifications of a target processor for the compiler system 1 in the embodiment of the present invention shall be described.

An instruction for this processor is 32-bit fixed length. In the case where the processor handles a value overflowing a value width which is greater than a value width represented in one instruction, the function can be realized with the combination of plural instructions.

As described later, the compiler system 1 in the first embodiment of the present invention can generate codes, replacing the instruction having the overflowing value by the combination of the plural instructions, once a value to be an operand for an instruction in the assembly program appears to overflow the width of a value to be represented in the instruction when linking. When the replacement is performed, a specific general register "R29" is used.

FIG. 3 shows one example of replacement patterns to plural instructions in the case where an operand value for a single instruction overflows.

In FIG. 3, "add", "ld", "br", "setlo", "sethi" "mov", and "jmp" represents instruction mnemonics. "R0", "R1", and "R29" represent general registers. "TAR" represents a register for configuring a target address. Further, "imm16" shows a 16-bit constant, "imm32" a 32-bit constant, "disp10" a 10-bit constant showing displacement, "disp20" a 20-bit constant showing displacement, "disp32" a 32-bit constant showing displacement, and "addr32" a 32-bit constant showing an address. Moreover, "LO( )" is an assembler macro, and returns the lower 16 bit of the constant in the parenthesis as a return value. Similarly, "HI( )" is an assembler macro, and returns the higher 16 bit of the constant in the parenthesis as a return value.

The first single add instruction is an add instruction, which adds the imm16 to a value of a register R1 and stores the result of the addition into the register R1. In the case where the operand value becomes greater than 16 bit, the plural instructions written on the right can achieve the function. Specifically, first, setlo instruction stores the lower 16 bit of the value into the lower 16 bit of a register R29. Then, the sethi instruction stores the higher 16 bit of the value into the higher 16 bit of the register R29. Thus, a value up to 32 bit is configured. Finally, the add instruction adds the storage value of R1 and the storage value of R29, and stores the result of the addition into the register R1.

The second single ld instruction is a memory access instruction which loads data from a memory address obtained by adding the storage value of the register R1 and the disp10, and stores the loaded data into the register R0. In the case where the displacement value becomes greater than 10 bit, the plural instructions written on the right can achieve the function. Specifically, first, as performed with the first add instruction, a displacement value up to 32 bit is stored in the register R29 by the setlo instruction and the sethi instruction. Then, the add instruction adds the storage value of the register R29 and the storage value of the register R1, and stores the result of the addition into the register R29. Finally, the ld instruction loads the data from the memory address of the storage value of the register R29, and stores the loaded data into the register R0.

The third single br instruction branches to an instruction address obtained by adding a current program counter value to the value of the disp20. In the case where the displacement value becomes greater than 20 bit, the plural instructions written on the right can achieve the function. Specifically, first, as performed with the first add instruction, a 32-bit branch destination address the addr32 is stored into the register R29 by the setlo instruction and the sethi instruction. Then, the mov instruction stores the storage value of the register R29 into the register for configuring the target address TAR. Finally, the jmp instruction branches an execution order of the instruction to an instruction stored in the TAR. Following is a detailed structure of each of the structural elements of the compiler system in the embodiment of the present invention.

The compiler 3 includes the instruction definition resource configuring unit 31 and a register assigning unit 32.

The instruction definition resource configuring unit 31 configures, as preparation for processing by the register assigning unit 32, the resources such as a register to be defined or referred to by for each instruction in an intermediate code.

A feature of the instruction definition resource configuring unit 31 is to detect possibility of each instruction to be decomposed into the plural instructions. As for an instruction to be possibly decomposed, the instruction definition resource configuring unit 31 configures the register R29 in the intermediate code, assuming the register R29 used for the decomposition to be defined and referred. Specifically, the instruction definition resource configuring unit 31 holds a table corresponding to an instruction conversion pattern in FIG. 3 for detecting whether or not the instruction to be possibly decomposed is a single instruction in the instruction conversion pattern. Moreover, in the case where the operand for the instruction, such as the imm16 and the disp20, is a statistically unfixed value; namely, a label and a result value of a calculation between labels, the instruction definition resource configuring unit 31 configures the register R29 in the intermediate code, assuming the register R29 to be defined and referred to by the instruction.

Figure 4:
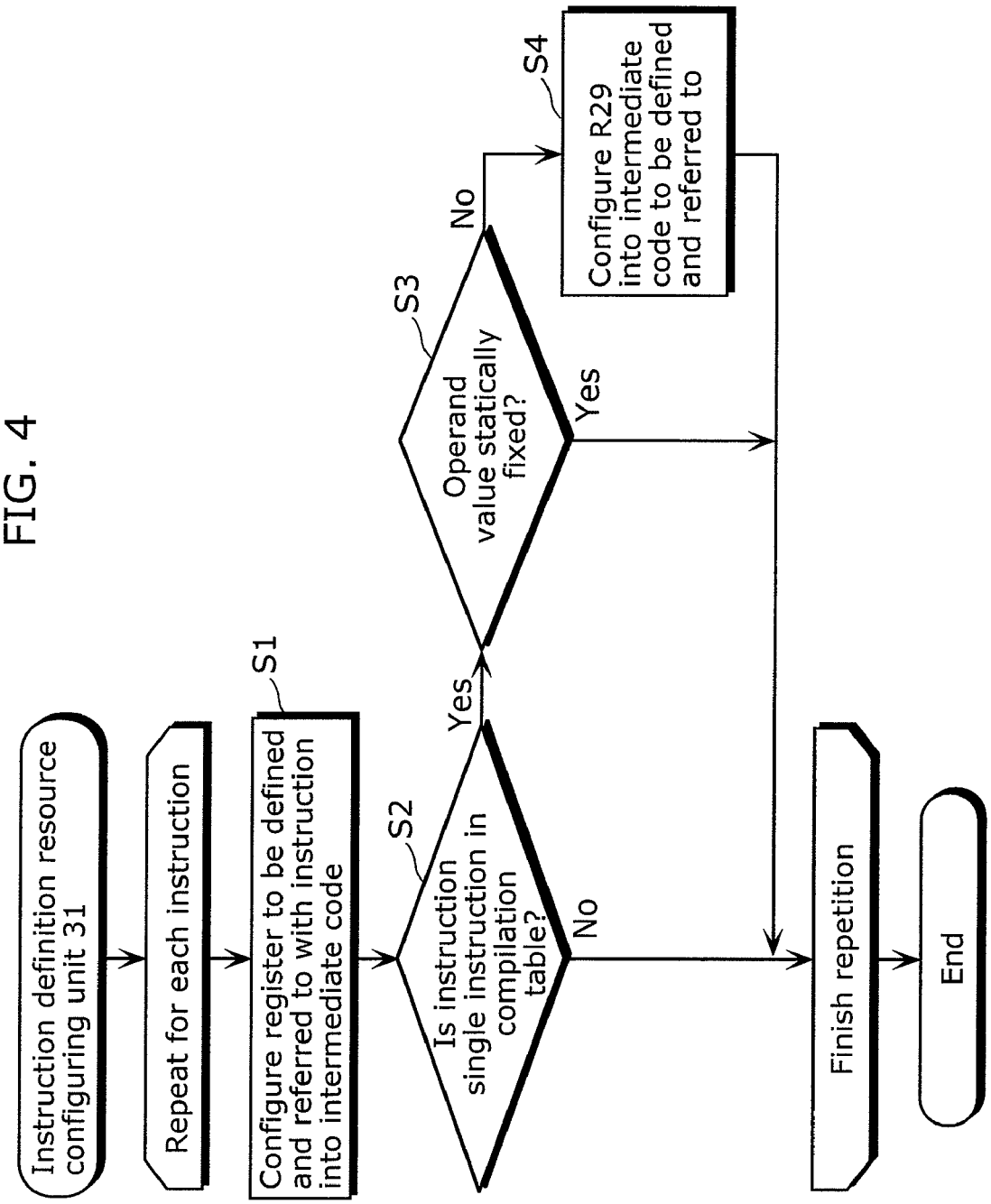
FIG. 4 is a flowchart showing processing details in an instruction definition resource configuring unit.

FIG. 4 is a flowchart showing processing details of the instruction definition resource configuring unit 31. The C language program 101 is assumed to be compiled into the intermediate code by the compiler 3 before the instruction definition resource configuring unit 31 executes the processing.

The instruction definition resource configuring unit 31 repeats the following processing for each instruction converted from an inputted source program (the C language program 101) into the intermediate code. First, the instruction definition resource configuring unit 31 configures a register to be defined by the instruction and a register to be referred to by the instruction into the intermediate code (Step S1). Next, the instruction definition resource configuring unit 31 judges whether or not the instruction is the single instruction in the instruction conversion pattern in FIG. 3 (Step S2). The instruction definition resource configuring unit 31 judges whether or not the operand value for the instruction is statically fixed (Step S3) only in the case where the instruction is the single instruction (Step S2: Yes). When the operand value is judged not to be statistically fixed (Step S3: No), the instruction definition resource configuring unit 31 configures the register R29 into the intermediate code, assuming the register R29 is defined and referred to by the instruction (Step S4). The instruction definition resource configuring unit 31 repeatedly executes the above processing until all the instructions are processed.

Similar to a register assigning unit in a conventional compiler, the register assigning unit 32 obtains live ranges for respective variables based on the information configured in the instruction definition resource configuring unit 31, and assigns a group of actual registers including the register R29 for each live range, preventing the live range of the variable assigned for the same register from overlapping.

The structure of the compiler 3 mentioned above allows the register R29 to be utilized as a general register as far as the live range of the respective register R29, in which the instruction could possibly be decomposed into the plural instructions, does not overlap each other. Thus, the register R29 can be assigned for both of the purposes; namely, for an instruction-decomposition use and a general-register use.

A program type configuring unit 41, a register use pseudo-instruction receiving unit 42 and an instruction code converting unit 43 in the assembler 4 sequentially operate to respective lines of the inputted assembly program generated by compiler 102 and the assembly program written by programmer 103.

The program type configuring unit 41, interpreting the description in an associated line, judges whether an inputted assembly program is one of the assembly program generated by compiler 102 generated by the compiler 3 and the assembly program written by programmer 103 written by the programmer. The program type configuring unit 41 configures a program type mode therein to: "1" in the case where the assembly program generated by compiler 102 is inputted; and "0" in the case where the assembly program written by programmer 103 is inputted. Specifically, the program type configuring unit 41 judges the inputted assembly program to be the assembly program generated by compiler 102 when a "FILE" pseudo-instruction appears before an instruction code in an assembly program file does. Here, only the compiler 3 outputs the "FILE" pseudo-instruction as a header.

In the case where a pseudo-instruction showing a register use is written on the line, the register use pseudo-instruction receiving unit 42 switches a register use mode therein upon receiving the pseudo-instruction. Specifically, the register use pseudo-instruction receiving unit 42 switches the register use mode to: "1" showing that the register R29 is available when a pseudo-instruction "ENABLE_R29 ON" indicating a start of a range that the register R29 is available as the general register appears; and "0" showing that the register R29 is unavailable when a pseudo-instruction "ENABLE_R29 OFF" indicating an end of the range that the register R29 is available as the general register appears. Through the above process the register use pseudo-instruction receiving unit 42 identifies the range that the register R29 is available as the general register based on interpretation on description in the pseudo-instruction.

The instruction code converting unit 43 converts the assembly program into the machine language code corresponding to instruction description in the line. When converting, the instruction code converting unit 43 refers to the above-mentioned program type mode and register use mode. The instruction code converting unit 43 outputs an error message showing that the register R29 is unavailable and ends the processing in the assembler 4 when: the program type mode is "0" indicating that the assembly program is written by the programmer and the register use mode is "0" indicating the register R29 to be unavailable; and the register R29 appears on the instruction description in the line.

Furthermore, the instruction code converting unit 43 holds a table corresponding to the instruction conversion pattern in FIG. 3 for detecting whether or not the instruction description in the line to be the single instruction written on the left of the conversion pattern. Moreover, in the case where the operand value for the instruction is a statistically unfixed value; namely, the label and the result value of the calculation between the labels, the instruction code converting unit 43 generates the machine language codes corresponding to respective plural instructions written on the right of the conversion pattern. However, this processing is not performed when the register use mode is "0" indicating the register R29 to be available. This causes all relevant instructions to the conversion pattern to be generated in a form of decomposed plural instructions except for the instructions in the range having the register use mode to be "1". Meanwhile, unnecessarily decomposed instructions are assumed to be recomposed in the optimization in the aforementioned linker 5. For this optimization, the instruction code converting unit 43 attaches the optimization information 106 to the object file 104 for identifying the generated decomposed plural instructions.

FIG. 5 shows one example of the optimization information 106.

The optimization information 106 includes, in parallel, a pair of an offset value of an instruction address covering starting of the machine language code string converted by the assembler 4 through a corresponding part and a pattern ID in an associated conversion pattern in FIG. 3. Each of pairs represents the associated conversion place.

FIG. 6 shows one example of the assembly program generated by compiler 102. In FIG. 6, the line (a) is the "FILE" pseudo-instruction outputted by the compiler 3 for sending a file name of the C language program. The assembler 4 can recognize an assembly program inputted by this pseudo-instruction to be the assembly program 102 generated by compiler 102 generated by the compiler 3. Further, the register R29 is used in lines (b) and (d). As mentioned above, the register R29 is used as a general register for the instruction with no need to be decomposed, by the compiler 3, into the plural instructions while linking. Specifically, the live range of the register R29 starts at the line (b) and ends at the line (d). In the line (b), the result that the content of the register R0 and the content of the register R1 are added is stored in the register R29. In the line (c), a value loaded from a memory address, having a value for which a constant 4 is added to the content of the register R2, is stored into the register R0. In the line (d), the content of the register R29 is subtracted from the content of the register R0. During the process, there exists no instruction which is possibly to be decomposed into the plural instructions when linking. Thus, the compiler 3 analyzes this and uses the register R29 as the general register. In the line (c), in particular, the type of the instruction itself agrees with the single instruction in the conversion pattern in FIG. 3. Meanwhile, the constant operand is fixed at 4. Thus, decomposition into the plural instructions when linking is statically found to be unnecessary. As a result, the compiler 3 judges that the use of the register R29 is unlikely since the single instruction is decomposed into the plural instructions.

Figure 7:
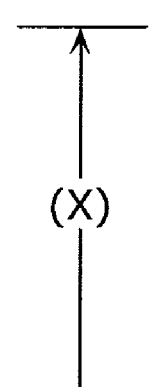
FIG. 7 shows one example of assembly programs written by programmer, including a pseudo-instruction "ENABLE_R29" in the first embodiment of the present invention.

FIG. 7 shows one example of the assembly program written by programmer 103 including an "ENABLE_R29".

In FIG. 7, the line (e) is a pseudo-instruction with which the programmer designates that a range, for which the register R29 is used as the general register, starts. Further, the line (h) is a pseudo-instruction with which the programmer designates that the range, for which the register R29 is used as the general register, ends. As a result, the register R29 is used as the general register in the range (X) from the line (e) to the line (h). In this range, expansion processing by the compiler system 1 in the case where the constant operand overflows, the conversion processing into the plural instructions, is not performed. In other ranges, the operand expansion processing using the register R29 is performed by the compiler system 1.

Figure 8:
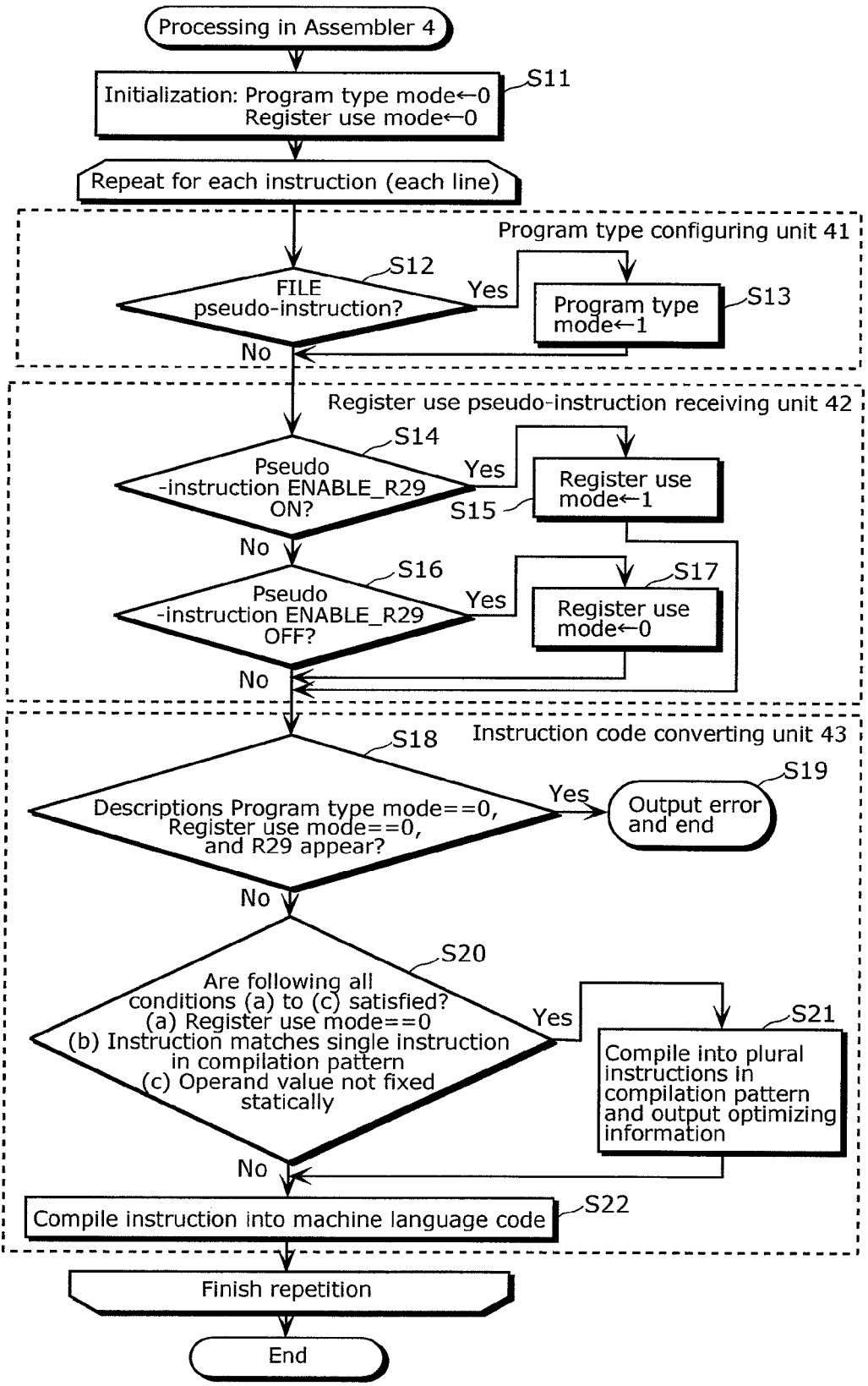
FIG. 8 is a flowchart showing a flow of assembler processing.

FIG. 8 is a flowchart showing a flow of processing by the assembler 4. First, the assembler 4 initializes both the program type mode and the register use mode, variables in the assembler 4, into "0" (Step S11). Then, the assembler 4 repeats the following processing for respective lines of the inputted assembly program.

The program type configuring unit 41 judges whether or not the "FILE" pseudo-instruction appears (Step S12). When the "FILE" pseudo-instruction appears (Step S12: Yes), the program type configuring unit 41 configures the program type mode to "1" showing that the inputted assembly program is generated by the compiler 3 (Step S13).

Then, the register use pseudo-instruction receiving unit 42 judges whether or not the pseudo-instruction "ENABLE_R29 ON" appears (Step S14). When the pseudo-instruction "ENABLE_R29 ON" appears (Step S14: Yes), the register use pseudo-instruction receiving unit 42 configures the register use mode to "1" showing that the register R29 is used as the general register (Step S15). The register use pseudo-instruction receiving unit 42 also judges whether or not the pseudo-instruction "ENABLE_R29 OFF" appears (Step S16). When the pseudo-instruction "ENABLE_R29 OFF" appears (Step S16: Yes), the register use pseudo-instruction receiving unit 42 configures the register use mode to "0" showing that the register R29 is used for expansion in the case where the constant operand overflows (Step S17).

The instruction code converting unit 43 judges whether or not: the program type mode is "0" showing that the inputted assembly program is the assembly program written by programmer 103 and the register use mode is "0" showing that the register R29 is used for expansion in the case where the constant operand overflows; and the register R29 is written in the instruction (Step S18). When the judgment is true, (Step S18: Yes), the programmer's description is found to be incorrect. Thus, the instruction code converting unit 43 outputs an error message and ends the processing by the assembler 4 (Step 19).

The instruction code converting unit 43 judges whether or not all of the following three conditions (a) to (c) are satisfied (Step S20), in that: (a) the register use mode is "0" showing that the register R29 is used for expansion in the case where the constant operand overflows; (b) the instruction matches one of single instructions in the conversion pattern in FIG. 3; and (c) the operand value in the instruction is not statically fixed. When all of the conditions (a) to (c) are satisfied (Step S20: Yes), the instruction code converting unit 43 converts the instruction in the line into the plural instructions written on the right of the conversion pattern. Simultaneously, the instruction code converting unit 43 attaches a pair of an instruction address offset value and the conversion pattern in FIG. 3 to a generated code (the object file 104) as the optimization information 106 regarding the conversion (Step S21). Here, the instruction address offset value covers the starting of a sequence of the instruction through the instruction. Then, the instruction code converting unit 43 converts the instruction into the machine language code and outputs the object file 104 (Step S22).

The assembler 4 repeats the above processing until all the lines are processed.

The linker 5 includes an address resolving unit 51 and a code optimizing unit 52. The address resolving unit 51 and the code optimizing unit 52 repeats their operations until a change of the code by processing in the code optimizing unit 52 disappears.

Similar to a general linker, the address resolving unit 51 fixes: a location address on the memory by linking plural object files 104 inputted into the linker 5; and unresolved address value in a symbol and unsolved displacement value included in each object files 104. When the fixed address value and the fixed displacement value overflow a width of the value in which the instruction is available to be expressed while fixing, the address resolving unit 51 outputs a message that the values overflow and ends the operations of the linker 5.

The code optimizing unit 52 holds a table corresponding to the conversion pattern in FIG. 3. The code optimizing unit 52: refers to the optimization information 106 showing a location of the decomposed plural instructions and the conversion pattern, added by the instruction code converting unit 43 in the above mentioned assembler 4; and then judges, based on the address value and the displacement value fixed in the address resolving unit 51, availability of the plural instructions to be expressed in the single instruction written on the left of the conversion pattern. When the plural instructions are available to be expressed in the single instruction, that is, the width of the fixed operand value fits into the single instruction, the code optimizing unit 52 replaces the plural instructions into the single instruction written on the left of the conversion pattern.

Figure 9:
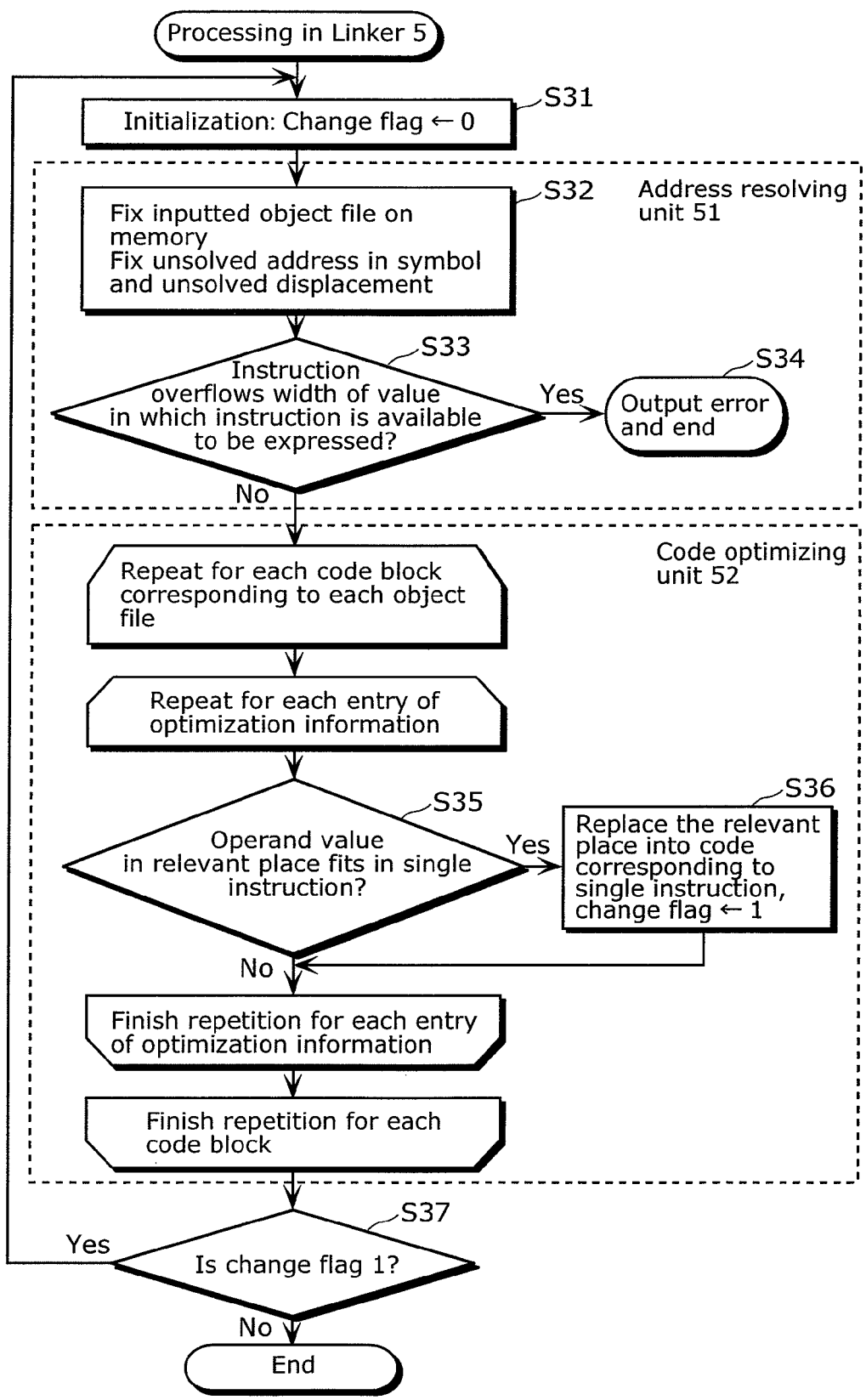
FIG. 9 is a flowchart showing a flow of linker processing in the first embodiment of the present invention.

FIG. 9 is a flowchart showing a flow of processing in the linker 5.

First, the linker 5 initializes a change flag showing a change of the code to "0" (Step S31).

Similar to a general linker, the address resolving unit 51 fixes: the location on the memory by linking the inputted plural object files; and the unresolved address in the symbol and the unsolved displacement value included in each of the object files (Step S32). The address resolving unit 51 judges whether or not the instruction having the fixed address value and the fixed displacement value overflow the width of value in which the single instruction is available to be expressed (Step S33). When the instruction overflows (Step S33: Yes), the address resolving unit 51 output a message accordingly, and then the linker 5 ends the processing (Step S34).

The code optimizing unit 52 repeats the following processing for a code block corresponding to each of the inputted object files 104. For each code block, the code optimizing unit 52 repeats the following processing for each of entries in the optimization information 106, that is each lines in FIG. 5, in the object file 104.

First, the code optimization unit 52 specifies a place at which the assembler 4 has decomposed the single instruction into the plural instructions, using the instruction address offset of the optimization information 106. The code optimization unit 52 specifies as well the conversion pattern, using the pattern ID of the conversion pattern. Then, the code optimizing unit 52 judges whether or not the operand value fixed in the address resolving unit 51 fits into a value operand width in a form written on the left of the conversion pattern in FIG. 3. In other words, the code optimizing unit 52 judges availability of the plural instructions to be expressed in the single instruction.

When the fixed operand value is judged to be fit into the value operand width (Step S35: Yes), the code optimization unit 52 replaces a relevant plural instruction code into the code corresponding to the single instruction written on the left of the conversion pattern, and configures the change flag showing the change of the code to "1" (Step S36).

The code optimizing unit 52 repeats the above processing for all the entries in the optimization information 106. Then, the code optimizing unit 52 repeats the above processing for the code block corresponding to each of the inputted object files.

When the above processing ends, the linker 5 judges whether or not the change flag is "1" showing the fact that the code has changed (Step S37). In the case where the code is "1" (Step S37: Yes), the linker 5 returns to Step 31 for repeating the above-mentioned processing. In the case where the code is not "1" (Step S37: No), the linker finishes the processing.

This coordination with the instruction code converting unit 43 in the assembler 4 and the code optimizing unit 52 in the linker 5 allows a pattern code of the plural instructions to be generated in the execution form file 105 generated consequentially, using the register R29 only for the single instruction that needs to be decomposed into the plural instruction.

The structures of the assembler 4 and the linker 5 mentioned above allow the programmer to use the register R29 for decomposing the single instruction into the plural instruction as the general register when the operand value overflows. Thus, the performance of the program improves.

In addition, error detectability of the program is secured when the programmer uses the register R29 as the general register, thus improving the development efficiency. Specifically, by writing the pseudo-instruction "ENABLE_R29", using the assembly program, the auxiliary register R29 for decomposing the instruction can be utilized as the general register. Furthermore, the assembler can detect an error that the register R29 could be described at an unintended location.

In addition, in a range in which the programmer utilizes the register R29 as the general register, the use of the register R29 by the combination with the assembler and the linker prevents the single instruction from decomposing into the plural instruction. This prevents a faulty execution result caused by unintentional destruction of the register R29 used as the general register by the programmer. Specifically, the overflow of the operand value in the range in which the register R29 is utilized as the general register can be detected as the error, when linking.

(Second Embodiment)

A compiler system in a second embodiment of the present invention shall be described as follows. Most of the structure of the compiler system in the second embodiment is similar to the compiler system in the first embodiment. However, a specification of a pseudo-instruction to an assembler 4 is different. The following describes the compiler system in the second embodiment, especially the differences from the compiler system in the first embodiment.

FIG. 10 shows one example of the assembly program generated by compiler 102.

In FIG. 10, the line (a) is a pseudo-instruction "expandinst_without_warning" which is unique to the second embodiment. This pseudo-instruction is for "providing expansion processing to a value operand without displaying a warning when linking." The compiler 3 outputs the pseudo-instruction to the starting of an assembly program when generating the assembly program.

FIG. 11 shows one example of the assembly program written by programmer 103.

In FIG. 11, a line (b) is a pseudo-instruction "noexpandinst" which is unique to the second embodiment. This pseudo-instruction is for "avoiding the expansion processing on the value operand." In addition, a line (e) is a pseudo-instruction "expandinst" which is unique to the second embodiment. This pseudo-instruction is for "enabling the expansion processing on the value operand with displaying the warning, when linking."A range (X) from the line (b) to the line (e) is assigned for the register R 29 to be used. In this range, an expansion processing by a compiler system 1 when the value operand overflows is not performed. In other ranges, the expansion processing on the value operand, using the register R29 by the compiler system 1, is provided.

As structural elements, the compiler system 1 in the second embodiment includes the compiler 3, the assembler 4 and the linker 5, as the compiler system 1 in the first embodiment does.

The compiler 3 always outputs the pseudo-instruction "expandinst_without_warning" shown in FIG. 10 to the starting of a file (the assembly program generated by compiler 102) when generating a code. This provides the expansion processing to the value operand with regard to the code that the compiler 3 automatically generates, and the warning display does not appear when linking.

Figure 12:
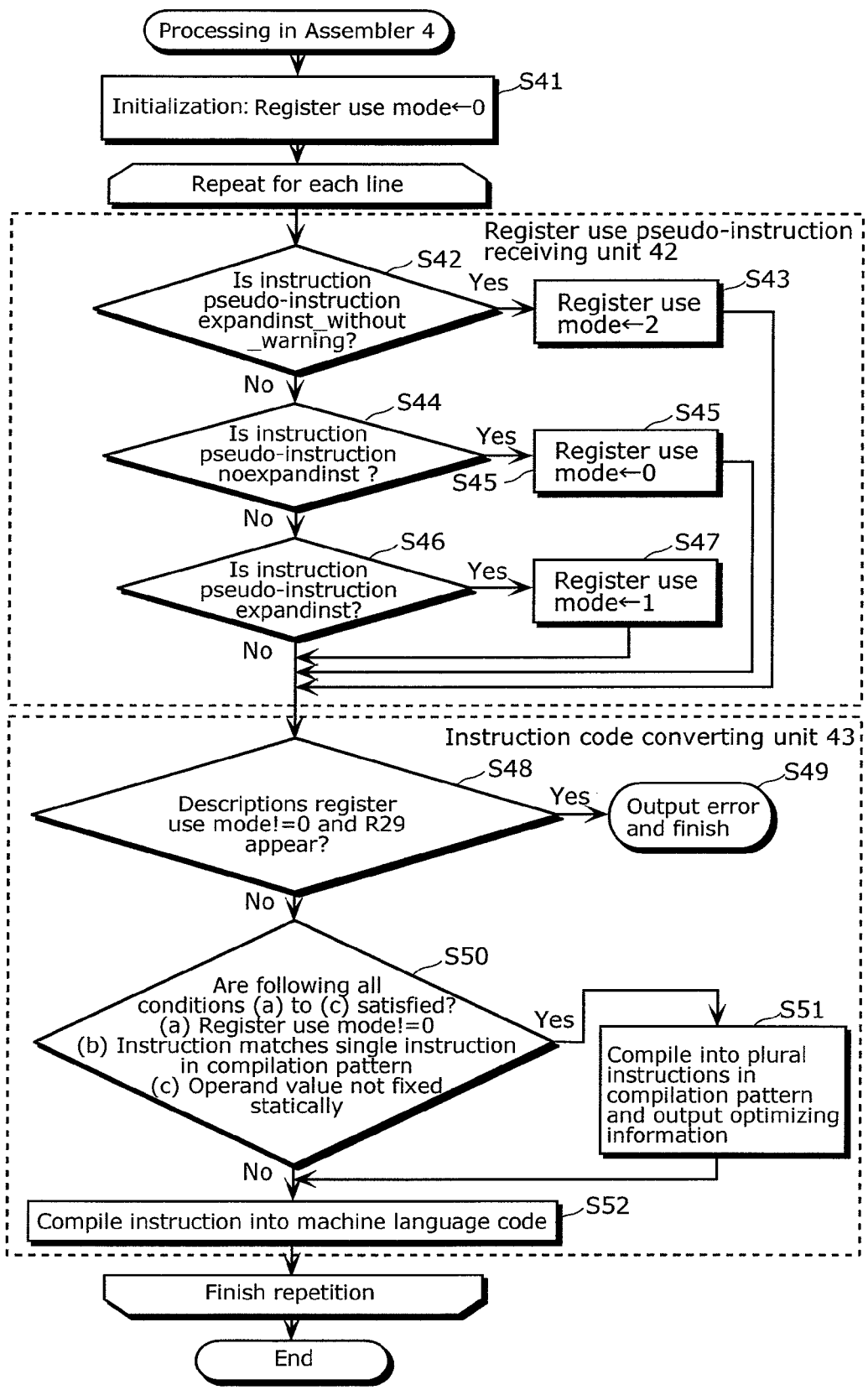
FIG. 12 is a flowchart showing a flow of assembler processing in the second embodiment of the present invention.

FIG. 12 is a flowchart showing a flow of processing in the assembler 4 in the second embodiment.

First, the assembler 4 initializes a register use mode, which is a variable in the assembler 4, into "0" (Step S41). Then, the assembler 4 repeats the following processing for each lines of the inputted assembly program.

The register use pseudo-instruction receiving unit 42 judges whether or not the pseudo-instruction "expandinst_without_warning" appears (Step S42). In the case where the pseudo-instruction "expandinst_without_warning" appears (Step S42: Yes), the register use pseudo-instruction receiving unit 42 configures the register use mode into "2" showing that the warning display does not appear with the register R29 being used for expansion when the value operand overflows. Moreover, the register use pseudo-instruction receiving unit 42 judges whether or not the pseudo-instruction "noexpandinst" appears (Step S44). In the case where the pseudo-instruction "noexpandinst" appears (Step S44: Yes), the register use pseudo-instruction receiving unit 42 configures the register use mode into "0" showing that the register R29 is used as a general register (Step S45). Furthermore, the register use pseudo-instruction receiving unit 42 judges whether or not the pseudo-instruction "expandinst" appears (Step S46). In the case where the pseudo-instruction "expandinst" appears (Step S46: Yes), the register use pseudo-instruction receiving unit 42 configures the register use mode into "1" showing that the register R29 is used for expansion with the warning displayed when a constant operand overflows.

The instruction code converting unit 43 judges whether or not: the register use mode is other than "0" (The register R29 is for expansion when the constant operand overflows.); description regarding the register R29 appears in a corresponding line (Step S48). When the judgment is true, (Step S48: Yes), the programmer's description is found to be incorrect. Thus, the instruction code converting unit 43 outputs an error message and ends the processing by the assembler 4 (Step 49).

The instruction code converting unit 43 judges whether or not all of the following three conditions (a) to (c) are satisfied (Step S50), in that: (a) the register use mode is other than "0" (The register R29 is for expansion when the constant operand overflows; (b) the instruction matches one of single instructions in the conversion pattern in FIG. 3; and (c) the operand value in the instruction is not statically fixed Step 50). When all of the conditions (a) to (c) are satisfied (Step S50:Yes), the instruction code converting unit 43 converts the instruction in the line into the plural instructions written on the right of the conversion pattern. Simultaneously, the instruction code converting unit 43 attaches a set of an instruction address offset value, a pattern ID in the instruction pattern in FIG. 3, and the register use mode to a generated code (the object file 104) (Step S51). Here, the instruction address offset value covers the starting of a sequence of the instruction through the instruction. Then, the instruction code converting unit 43 converts the instruction into the machine language code and outputs the object file 104 (Step S52).

The assembler 4 executes the above processing until all the lines are processed.

FIG. 13 shows one example of the optimization information 106 mentioned above. Compared with the optimization information 106 in the first embodiment, the optimization information 106 in the second embodiment additionally includes the register use mode, and thus configured in parallel with a combination of: an offset value of the instruction address covering the starting of a machine code string converted by the assembler 4 through a relevant part; a pattern ID in the associated converting pattern in FIG. 3; and the register use mode. Each of the combinations represents the associated converting part.

Figure 14:
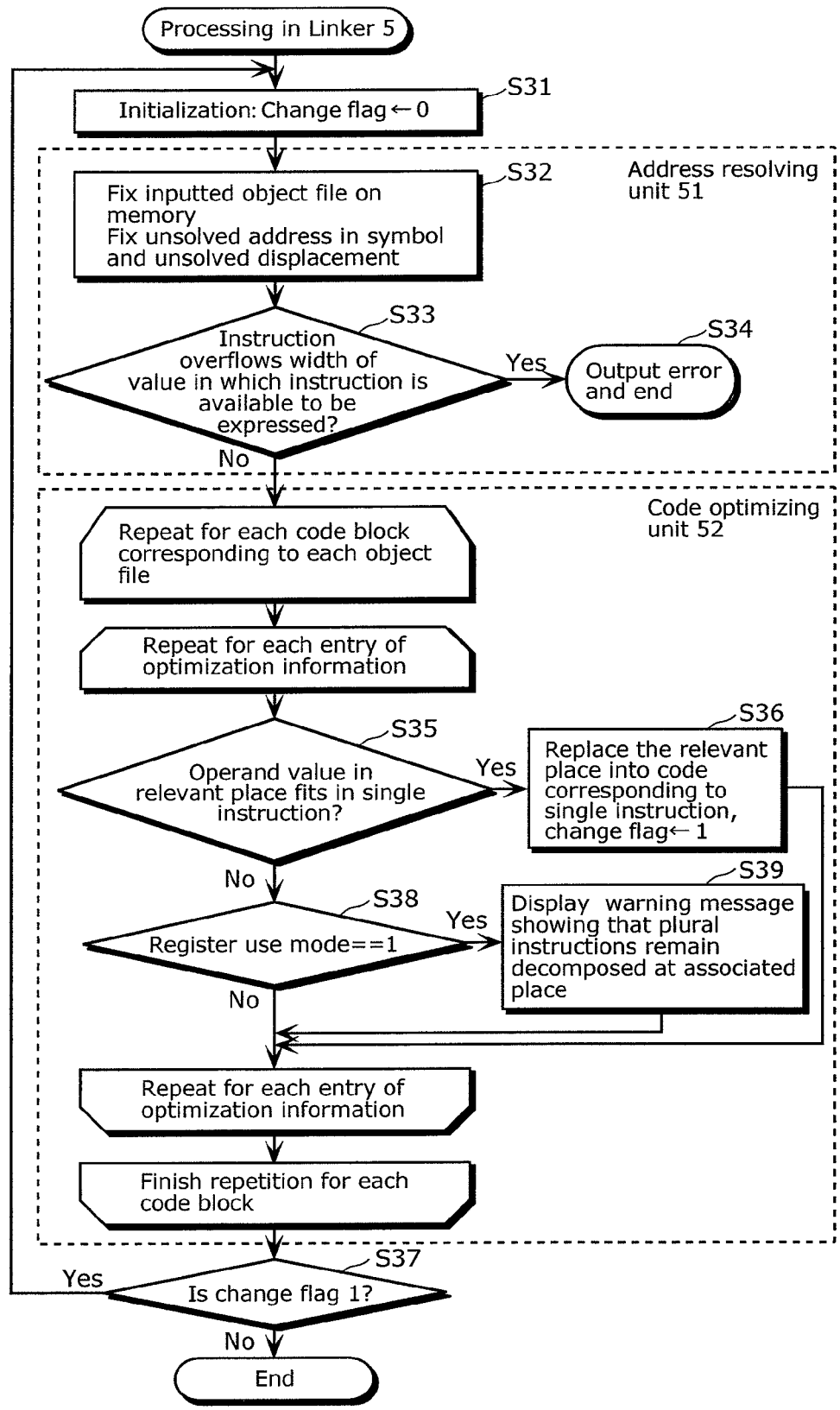
FIG. 14 is a flowchart showing a flow of linker processing in the second embodiment of the present invention.

FIG. 14 is a flowchart showing a flow of linker processing in the second embodiment of the present invention. Compared with the flow of the processing in the linker 5 in FIG. 9 of the first embodiment, Steps S38 and S39 are additionally included in a flow of processing in the linker 5 in the second embodiment. Operations in other steps are the same as the respective steps in the linker 5 in the first embodiment. The processing in the code optimization unit 52 shall be described as follows.

The code optimizing unit 52 repeats the following processing for a code block corresponding to each of the inputted object files 104. For each code blocks, the code optimizing unit 52 repeats the following processing for each of entries in the optimization information 106, that is each lines in FIG. 13, in the object file 104.

First, the code optimization unit 52 specifies a place at which the assembler 4 has decomposed the single instruction into the plural instructions, using the instruction address offset of the optimization information 106. The code optimization unit 52 specifies as well the conversion pattern, using the pattern ID of the conversion pattern. Then, the code optimizing unit 52 judges whether or not the operand value fixed in the address resolving unit 51 fits into a value operand width in a form written on the left of the conversion pattern in FIG. 3 (Step S35). In other words, the code optimizing unit 52 judges availability of the plural instructions to be expressed in the single instruction.

When the operand value is judged to be fit into the value operand width (Step S35: Yes), the code optimizing unit 52 replaces a relevant plural instruction code written on the left of the conversion pattern into a code corresponding to the single instruction, and then, configures the change flag showing a change of the code into "1" (Step S36).

When the operand value is judged not to be fit into the value operand width (Step S35: No), the code optimizing unit 52 judges whether or not the register use mode in the optimization information is "1" (Step S38). In the case where the register use mode is "1" showing that expansion is performed with warning when constant operand overflows (Step S38: Yes), the code optimization unit 52 displays the warning message showing that the plural instructions remain decomposed at the associated place (Step S39). In the case where the register use mode is "2" (Step S38: No), the warning message is not displayed even though the plural instructions remains decomposed at the associated place. The code optimizing unit 52 repeats the above processing for all the entries in the optimization information 106. Then, the code optimizing unit 52 repeats the above processing for the code block corresponding to each of the inputted object files.

When the above processing ends, the linker 5 judges whether or not the change flag is "1" showing the fact that the code has changed (Step S37). In the case where the code is "1" (Step S37: Yes), the linker 5 returns to Step 31 for repeating the above-mentioned processing. In the case where the code is not "1" (Step S37: No), the linker 5 finishes the processing.

The structures of the assembler 4 and the linker 5 mentioned above: prevent the assembly program generated by the compiler 3 from displaying the warning message when expanding to the plural messages in the case where the operand value overflows; and control the assembly program described by programmer 103, using the pseudo-instruction, for displaying the warning message when the operand value overflows. This facilitates for specifying the expanding part to the plural messages attributed to a part written by the programmer, and improves performance and development efficiency such as code size tuning.

The above is the compiler system and the structural elements thereof in the present invention based on the embodiments. However, the present invention is not limited to the above embodiments. For example, (1) The above embodiments assume the compiler system for the C language; however, the present invention is not limited to the C language. The present invention is still advantageous in the case where other programming languages are adopted, as well.

(2) The above embodiments assume to use a fixed-length instruction processor as a target processor; however, the present invention is not limited to this. This invention can be applied to many variable-length instruction processors with limitation to a width of an operand value which one instruction can handle.

(3) In the above embodiments, the compiler system is structured with the driver, the compiler, the assembler, and the linker; however, the present invention is not limited to this structure. For example, the compiler system may be subdivided into more structural elements or sub-tools. Meanwhile, all the functions of the compiler system may be implemented in one structural element.

(4) As a conversion pattern of the instruction, the above embodiments have adopted conversion between the single instruction and the plural instructions; however, the present invention is not limited to this conversion pattern. Specifically, the conversion may be between: the plural instructions; the single instruction, and another single instruction having a different mnemonic from the single instruction; and the single instruction and another single instruction having a different operand width from the single instruction.

This conversion may be realized by adjusting as needed the conversion pattern in FIG. 3. This allows the present invention to be utilized not only for the expansion of the value operand, but also for selection of codes based on the performance, the running cost, or the power consumption of the target processor.

(5) As a conversion pattern of the instruction, the above embodiments have adopted the conversion of the single instruction into the plural instructions, that is, the conversion having two types of instruction patterns; however, the present invention is not limited to this conversion pattern. The conversion may be performed through plural steps having three or more patterns. For example, the conversion may be: a three-step conversion including a short single instruction, a long single instruction, and plural instructions; and a three-step conversion including a single instruction, plural instructions including a small number of instructions, and plural instruction with a large number of instructions. This conversion may be realized by adjusting the conversion pattern in FIG. 3 to have to three or more steps. This allows the present invention to choose more detailed instruction patterns.

(6) The above embodiments adopt the assembler pseudo-instructions for judging whether the assembly program inputted into the assembler is either generated by the compiler or written by the programmer; however, the present invention is not limited to this interface. For example, this invention may transmit a type of the assembler program by an option specification or a pragma directive (# pragma directive). The transmission scheme may be selected depending on the needs of the programmer, such as the source program is difficult to edit, and the source program is desired to be specified in details.

(7) The above embodiments have adopted the pseudo-instruction to the assembler as a user interface by the programmer for specifying a register use and the range thereof; however, the transmission scheme in the present invention is not limited to this interface. For example, this invention may adopt an option specification or the # pragma directive as the transmission scheme. In addition, the transmission scheme may not be limited to the scheme writing the pseudo-instruction at the entry and the exit of the range, which mentioned in the above embodiments: The transmission scheme may be writing information about the range in a file header. Furthermore, as a grain of a specified area, the specification may be performed, using a finer grain; namely, on a operand register basis. For example, the operand register may be changed based on the operand register's use (R29 and Rx29, for example) and specified on a register basis. For example, R29 specifies the use of the register R29, and Rx29 specifies the use of another register than the register R29. Meanwhile, the use of the register may be specified on an instruction basis: As larger granularity, the use of the register may be specified, for example, on a file basis. (8) The above embodiments have adopted the pseudo-instruction to the assembler as the user interface by the programmer for specifying a register use and the range thereof; however, the specification scheme of the register use and the range thereof are not limited with or without this interface. For example, the present invention may be structured for judging the range that the register R29 is used to be a general register use range by analyzing the assembly program by the assembler without the pseudo-instruction. This improves program writing efficiency since the programmer needs to provide no explicit designations.

(9) In the above mentioned embodiments, the register R29 shares both of uses; namely, the use for the general register and the use for instruction decomposition in the case where the value operand overflows; however, the present invention is not limited to the register uses. For example, the register R29 may share both uses, such as the use for the general register and a hardware control register use for a Direct Memory Access (DMA) controller for transmitting the DMA or a dedicated computing unit. This allows a resource dedicated to hardware to be used for software, and the register use efficiency in a generated code improves.

(10) In the above embodiments, the register R29 is statically used for instruction decomposition when the value operand overflows; however, the present invention is not limited to this. For example, the present invention may be structured for: transmitting, from the compiler to the assembler or the linker, a group of registers which is available for instruction decomposition at each part as the optimization information; and utilizing the register selected out of the group shown with the optimization information for the instruction decomposition use. This improves flexibility in the register use and efficiency in register use efficiency in the generated code.

(11) Note that, regarding the plural registers that the target processor includes, the compiler, in the C language program, may specify the instruction the register uses for the instruction expansion use and transmit the information on the instruction to the assembler and the linker. Upon receiving the information, the assembler and the linker, based on the information, may select the register used as the general register.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The present invention can be applied to a compiler system which compiles a source program written in the C language and an assembly language into a machine language program.

What is claimed is:

1. A compiling apparatus comprising a processor which compiles a program written in a high-level programming language or an assembly language into a machine language code on which a target processor operates, the compiling being performed by a computer, said compiling apparatus comprising:
   a first use instruction judger operable to judge whether or not a register of the target processor is used for a first use based on each of instructions in the program; and
   a second use instruction generator operable to generate the machine language code to use the register for a second use when said first use instruction judger judges that the each of instructions does not to use the register for the first use, the second use being different from the first use,
   wherein the second use is for a complement to an instruction of which a value operand overflows an operand width when the instruction in the program is converted into the machine language code, the complement is to divide the instruction, of which the value operand overflows the operand width, into plural instructions using the register, and wherein said first use instruction judger is operable to judge an availability of the register to be used for the first use according to an area of a value which an operand can obtain.

2. The compiling apparatus according to claim 1, wherein the one of the first use and the second use is for converting one or the plural instructions into another one or plural instructions which are different from and equivalent to the one or the plural instructions.

3. The compiling apparatus according to claim 1, wherein one of the first use and the second use is for controlling a specific function of the target processor.

4. The compiling apparatus according to claim 1, comprising:
   a compiler which compiles the program written in the high-level programming language into an assembly program;
   an assembler which converts the assembly program into the machine language code and generates object files each of which contains the machine language code; and
   a linker which converts one or more of the object files into an execution form file by linking the one or the more object files,
   wherein said compiler includes said first use instruction judger and said second use instruction generator, and
   said first use instruction judger is operable to analyze, with processing being performed by said assembler and said linker following said compiler, an instruction which possibly uses the register for the first use to be an instruction to use the register for the first use.

5. The compiling apparatus according to claim 4, wherein said first use instruction judger is operable to judge the availability of the register to be used for the first use by an instruction type.

6. The compiling apparatus according to claim 4,
   wherein said compiler transmits information, on a status of use of registers for the second use in each instruction in the program, to one of said assembler and said linker, the information describing the registers which the target processor includes, and in the inputted each instruction, said assembler and said linker selects the registers to be used for the first use based on the information transmitted from said compiler.

7. The compiling apparatus according to claim 4, wherein said assembler specifies part of a range in the inputted assembly program in which the register is used as a range in which the register is used for the first use; and
   specifies a rest of the part of the range as a range in which the register is used for the second use.

8. The compiling apparatus according to claim 7, wherein the second use is for a complement to the instruction, by one of said assembler and said linker, of which the value operand overflows the operand width when the assembly program is converted into the machine language code.

9. A computer-readable program product recorded on a non-transitory computer-readable recording medium, which, when loaded into a computer, enables the computer to function as a compiling apparatus which compiles a program written in a high-level programming language or an assembly language into a machine language code on which a target processor operates, the program product including:
   a first use instruction judger operable to judge whether or not a register of the target processor is used for a first use based on each of instructions in the program; and
   a second use instruction generator operable to generate the machine language code to use the register for a second use when said first use instruction judger judges that the each of instructions does not to use the resource for the first use, the second use being different from the first use,
   wherein the second use is for a complement to an instruction of which a value operand overflows an operand width when the instruction in the program is converted into the machine language code, the complement is to divide the instruction, of which the value operand overflows the operand width, into plural instructions using the register, and said first use instruction judger is operable to judge an availability of the register to be used for the first use according to an area of a value which an operand can obtain.

10. The computer readable program product recorded on a non-transitory computer readable recording medium according to claim 9, wherein the one of the first use and the second use is for converting one or the plural instructions into another one or plural instructions which are different from and equivalent to the one or the plural instructions.

11. The computer readable program product recorded on a non-transitory computer readable recording medium according to claim 9, wherein one of the first use and the second use is for controlling a specific function of the target processor.

12. A non-transitory computer-readable recording medium having a program thereon recorded, the program, when loaded into a computer, causes the computer to function as a compiling apparatus that compiles a program written in a high-level programming language or an assembly language into a machine language code on which a target processor operates, the recording medium including:
   a first use instruction judger operable to judge whether or not a register of the target processor is used for a first use based on each of instructions in the program; and
   a second use instruction generator operable to generate the machine code to use the register for a second use when said first use instruction judger judges that the each of instructions does not to use the register for the first use, the second use being different from the first use,
   wherein the second use is for a complement to an instruction of which a value operand overflows an operand width when the instruction in the program is converted into the machine language code, the complement is to divide the instruction, of which the value operand overflows the operand width, into plural instructions using the register, and wherein said first use instruction judger is operable to judge an availability of the register to be used for the first use according to an area of a value which an operand can obtain.

13. The non-transitory computer readable recording medium according to claim 12, wherein the one of the first use and the second use is for converting one or the plural instructions into another one or plural instructions which are different from and equivalent to the one or the plural instructions.

14. The non-transitory computer readable recording medium according to claim 12, wherein one of the first use and the second use is for controlling a specific function of the target processor.

15. A computer-readable program product recorded on a non-transitory computer-readable medium comprising a program which functions in a processor, the program comprising:
   a first code for judging whether or not a register of the processor for a first use based on each of instructions in the program; and
   a second code for generating machine code to use the register of the processor for a second use when said first use code judging that the each of instructions does not to use the register for the first use, the second use being different from the first use,
   wherein the second use is for a complement to an instruction of which a value operand overflows an operand width when the instruction in the program is converted into the machine language code, the complement is to divide the instruction, of which the value operand overflows the operand width, into plural instructions using the register, and wherein said first use is for judging an availability of the register to be used for the first use according to an area of a value which an operand can obtain.

16. The program according to claim 15, wherein one of the first use and the second use is for controlling a specific function of the target processor.

17. A non-transitory computer-readable recording medium in which a program operates a processor, the program includes:
   a first code for judging whether or not a register of the processor for a first use based on each of instructions in the program; and
   a second code for generating machine code to use the register of the processor for a second use when said first use code judging that the each of instructions does not to use the register for the first use, the second use being different from the first use,
   wherein the second use is for a complement to an instruction of which a value operand overflows an operand width when the instruction in the program is converted into the machine language code, the complement is to divide the instruction, of which the value operand overflows the operand width, into plural instructions using the register, and wherein said first use is for judging an availability of the register to be used for the first use according to an area of a value which an operand can obtain.

18. The non-transitory computer readable recording medium according to claim 17, wherein the one of the first use and a second use is for converting one or the plural instructions into another one or plural instructions which are different from and equivalent to do one or the plural instructions.

19. A computer-readable program product, the program product being recorded on a non-transitory computer-readable recording medium that comprises a program, written in a high-level programming language or an assembly language into a machine language code, said computer-readable program product comprising information which indicates;
   a first use for judging whether or not a register in a processor and a range in which the resister is used for the first use based on each of instructions in the program, a second use for generating the machine code to use the register in the processor for the second use when said first use code judging that the each of instructions does not to use the register for the first use, the second use being different from the first use, wherein the second use includes a complement to an instruction of which a value operand overflows an operand width when the instruction in the program is converted into the machine language code, the complement is to divide the instruction, of which the value operand overflows the operand width, into plural instructions using the register, and wherein said first use judges an availability of the register to be used for the first use according to an area of a value which an operand can obtain.

20. The program according to claim 19, wherein the information includes a pseudo-instruction to an assembler.

21. The program according to claim 19, wherein the information includes an instruction indicating a start and an end of the range in which the register is used for a designated use.

* * * * *